United States Patent [19]
Rabizadeh

[11] Patent Number: 5,606,123
[45] Date of Patent: Feb. 25, 1997

[54] TIRE PRESSURE MONITORING DEVICE CAPABLE OF BEING FOLDED

[76] Inventor: Masoud Rabizadeh, 23325 Saint Andrews, Mission Viejo, Calif. 92692

[21] Appl. No.: 626,501

[22] Filed: Apr. 2, 1996

Related U.S. Application Data

[63] Continuation-in-part of Ser. No. 441,729, May 16, 1995, Pat. No. 5,503,012.

[51] Int. Cl.$^6$ .................................................. B60C 23/02
[52] U.S. Cl. ......................................................... 73/146.8
[58] Field of Search ............................. 73/146.3, 146.8; 33/169 B; 137/227

[56] References Cited

U.S. PATENT DOCUMENTS

| | | |
|---|---|---|
| D. 156,807 | 1/1950 | Battersby . |
| 1,495,553 | 5/1924 | Durham . |
| 3,720,224 | 3/1973 | Foxhall . |
| 3,907,461 | 9/1975 | Bouder . |
| 4,310,014 | 1/1982 | Parker . |
| 4,411,302 | 10/1983 | Kuypers . |
| 4,539,928 | 9/1985 | Todhunter et al. .................... 73/146.8 |
| 4,966,035 | 10/1990 | Huang . |
| 5,307,846 | 5/1994 | Heinemann . |

FOREIGN PATENT DOCUMENTS

925611  5/1963  United Kingdom .

*Primary Examiner*—Richard Chilcot
*Assistant Examiner*—William L. Oen
*Attorney, Agent, or Firm*—Richard C. Litman

[57] ABSTRACT

A tire pressure monitoring device includes a pressure gauge pivotably mounted to a base which can be attached to a tire valve stem. The pressure gauge includes a ring-shaped piston and spring mounted in a transparent sleeve. Other embodiments use an electronic pressure sensor to generate a digital pressure display. Optionally the device may include a transmitter to provide pressure data to a display in the interior of a motor vehicle.

8 Claims, 9 Drawing Sheets

TIRE PRESSURE MONITORING DEVICE CAPABLE OF BEING FOLDED

This application is a continuation-in-part of application U.S. Ser. No. 08/441,729, filed May 16, 1995, now U.S. Pat. No. 5,503,012.

BACKGROUND OF THE INVENTION

1. Field of the Invention

The present invention relates to a pressure gauge which is mounted to a vehicle's wheel and continuously displays the air pressure in the pneumatic tire forming part of the wheel.

2. Description of the Prior Art

When using the air hose at a service station, motorists often find that the pressure gauge incorporated into the air hose is inoperative and that they have forgotten to bring their pocket tire pressure gauge with them. In such situations, the motorist is left without a reliable means, for ascertaining whether his or her tires are properly inflated, thus exposing the motorist to the potential hazards such as loss of control due to under inflation, tire blowout, poor fuel economy, and excessive tire wear associated with improperly inflated tires.

To remedy this problem tire gauges that permanently attach to the vehicle's wheels have been proposed in the prior art. However, none of the references cited below are seen to teach or suggest the pressure gauge of the present invention which remains on the vehicle's wheel during operation, and includes a pressure indicating member disposed in a transparent sleeve and an opening which allows open fluid communication between the interior of the tire and the interior of the transparent sleeve.

U.S. Pat. No. 1,495,553, issued to Durham, shows a tire gauge which is incorporated into the tire inflating apparatus. The Durham device does not display tire pressure, but rather shuts off air supply when the tire pressure reaches a preset level.

U.S. Pat. No. 3,720,224, issued to Foxhall, shows a valve stem cap having a tire gauge. The Foxhall device does not display pressure continuously and must be pressed in by the user to give a pressure reading.

U.S. Pat. No. 3,907,461, issued to Bouder, shows a hand air pump having a built in pressure gauge. Bouder does not show a gauge for continuously displaying tire pressure.

U.S. Pat. No. 4,310,014 issued to Parker, shows a valve stem with a built in pressure gauge. In the Parker device the bleeder valve is supported by an extensible sleeve which allows the bleeder valve to protrude farther away from the base of the valve stem when the tire pressure is increased.

U.S. Pat. No. 4,411,302, issued to Kuypers, shows one type of conventionally used valve stem.

U.S. Pat. No. 4,966,035, issued to Huang, shows a pocket type pressure gauge.

U.S. Pat. No. 5,307,846, issued to Heinemann, shows a device for equalizing the pressure in all four tires of a motor vehicle.

U.S. Pat. No. Des. 156,807, issued to Battersby, shows the ornamental design for a pocket type pressure gauge.

United Kingdom Patent Document Number 925,611, by Gfoell, shows a valve stem cap with an integral pressure gauge. The pressure gauge of Gfoell has a sliding member which protrudes above the open end of a tube to allow the tire pressure to be ascertained by a user.

None of the above inventions and patents, taken either singly or in combination, is seen to describe the instant invention as claimed.

SUMMARY OF THE INVENTION

The present invention is directed to a tire gauge for continuously displaying the tire pressure, which can be attached to an existing valve stem. The pressure gauge of the present invention includes a pressure indicating member disposed in a transparent sleeve surrounding a central tube. The central tube has an opening which allows open fluid communication between the interior of the tire and the annular space between the transparent sleeve and the central tube.

Accordingly, it is a principal object of the invention to provide a tire pressure gauge attached to a wheel which continuously displays the tire pressure.

It is another object of the invention to provide a valve stem attachment having an integral pressure gauge.

It is a further object of the invention to provide a tire pressure gauge for continuously displaying the tire pressure which attaches to a standard valve stem.

Still another object of the invention is to provide a tire pressure gauge having an electronic tire pressure display.

Yet another object of the invention is to provide a valve stem attachment having an integral tire pressure gauge, which is foldable after attachment to the valve stem so as not to protrude excessively from the wheel rim.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
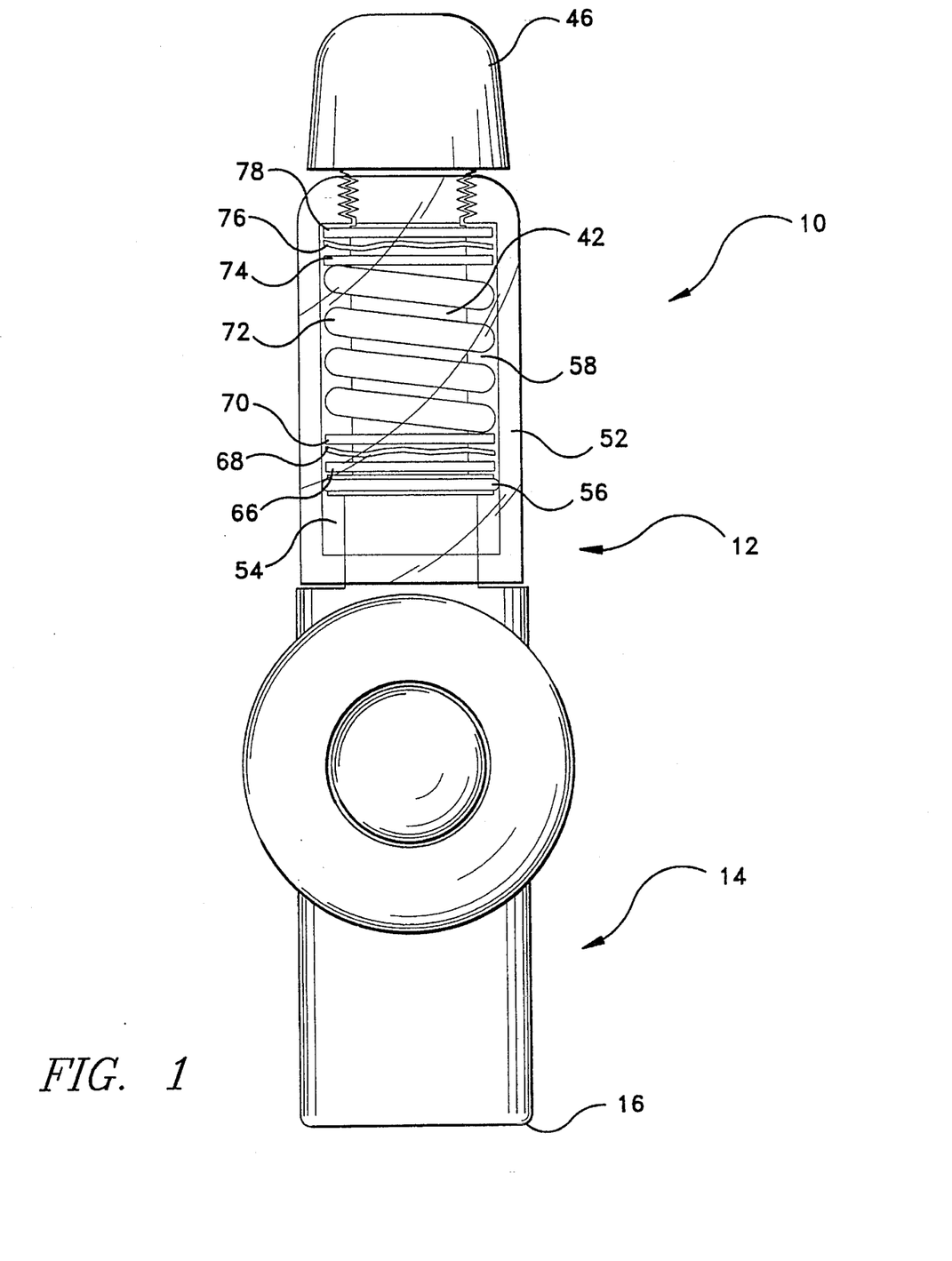
FIG. 1 is a front view of the tire pressure monitoring device with a mechanical pressure gauge.
Figure 2:
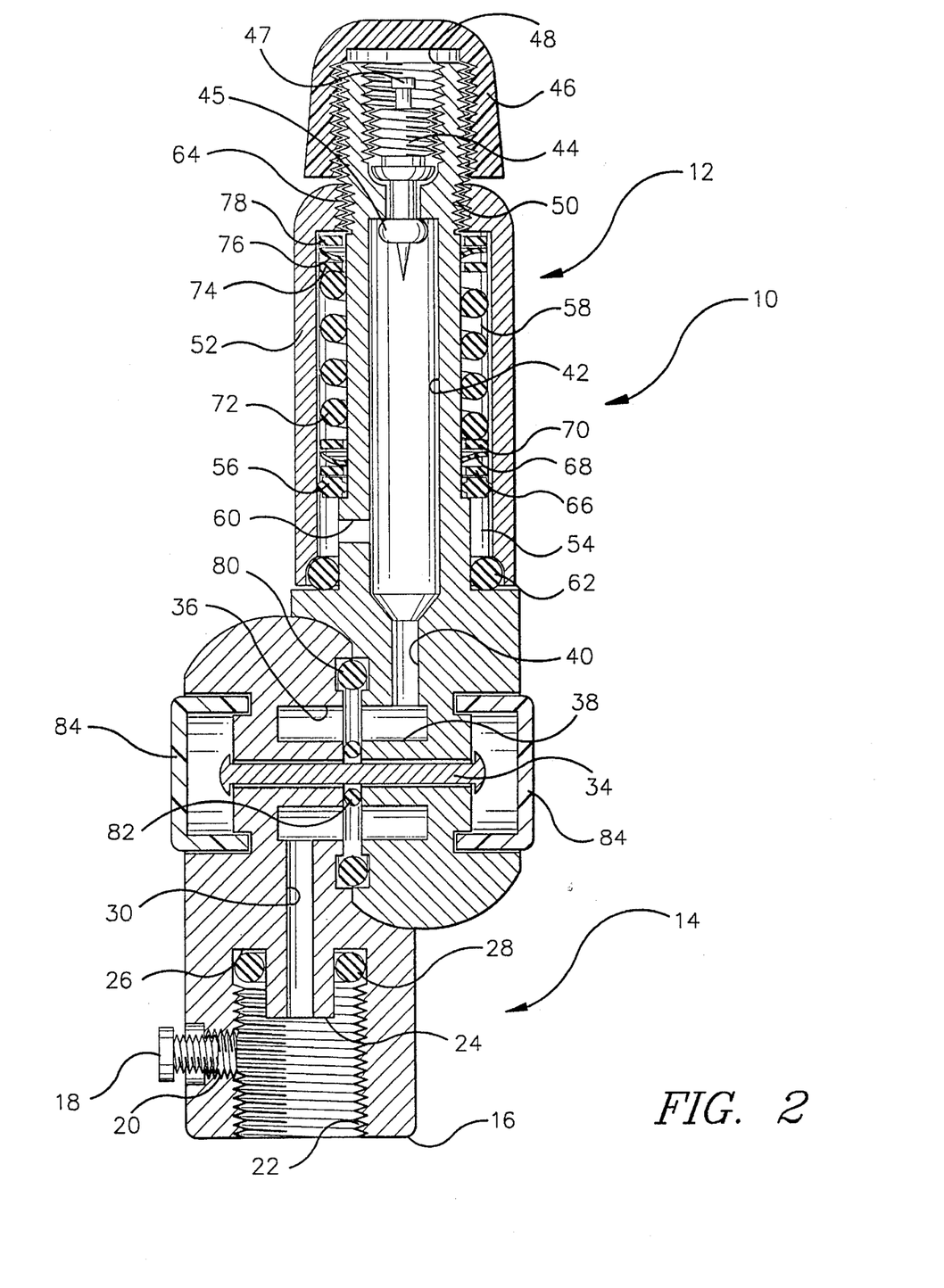
FIG. 2 is a cross sectional view of the tire pressure monitoring device with a mechanical pressure gauge.
Figures 3, 4, 5:
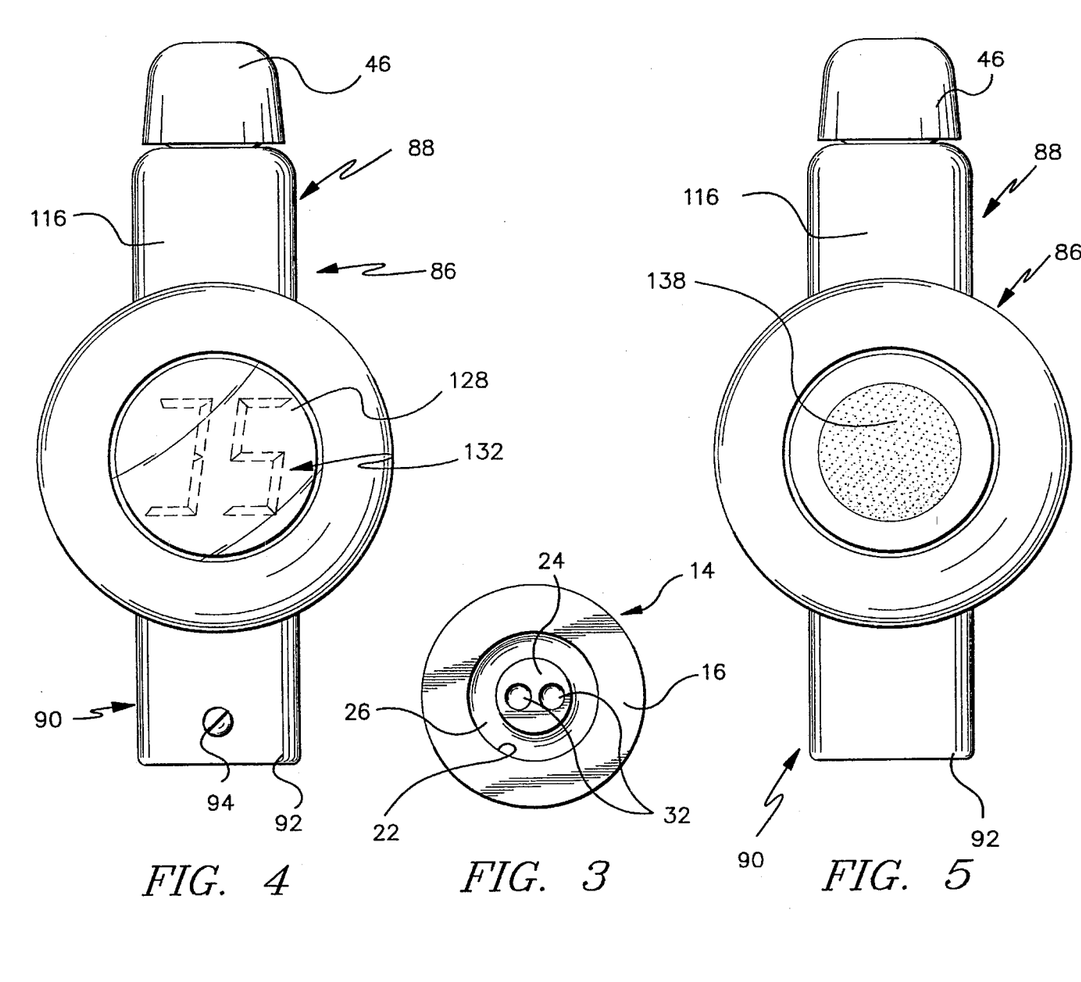
FIG. 3 is a bottom view of the cavity for the attachment of the present invention to a standard valve stem.
FIG. 4 is a front view of the pressure monitoring device with a digital display.
FIG. 5 is a rear view of the electronic pressure monitoring device showing the solar cell.

Referring to FIGS. 1–3 a first embodiment of the present invention is seen. The embodiment of FIGS. 1–3 is designed to attach to the valve stem of a vehicle's wheel in the manner of a standard valve stem cap (identical to cap 46 in FIGS. 1 and 2). The pressure monitoring device 10 has a gauge portion 12 and an attachment portion 14. The attachment portion 14 has a threaded end 16 which screws on to the existing tire valve stem in the manner of the conventional valve stem cap. Set screw 18 engages a threaded hole 20 in the threaded end 16 and is used to frictionally lock the pressure monitoring device 10 to the tire valve stem after the device 10 is screwed on to the valve stem. This feature helps reduce the possibility of loosening or theft of the device 10.

The threaded end 16 has a threaded cavity 22 which has a raised platform 24 at the bottom thereof. A groove 26 surrounds platform 24. The groove 26 is deep enough so that not only can the O-ring 28 be housed therein, but also the platform 24 can penetrate into the valve stem when device 10 is screwed on to the valve stem. The bleeder valve (identical to valve 44 shown in FIG. 2) of the existing valve stem has a central needle which must be depressed to allow fluid communication to the interior of the tire. The penetration of the platform 24 into the existing bleeder valve of the vehicle wheel, depresses the needle of the valve and allows for open fluid communication between the device 10 and the interior of the tire. It should also be noted that the air passage 30 is bifurcated near the platform 24 into openings 32 (see FIG. 3). This arrangement creates a flat region between the openings 32 which acts to depress the needle of the existing bleeder valve without the needle obstructing air flow through openings 32.

Attachment portion 14 is pivotably attached to gauge portion 12 by rivet 34. Rivet 34 allows gauge portion 12 to pivot relative to the attachment portion 14 about the longitudinal axis of the rivet 34. A first annular cavity 36 is formed in attachment portion 14, and a second annular cavity 38 is formed in gauge portion 12. The air passage 30 communicates with first annular cavity 36 which remains in continuous registry, and thus fluid communication, with the second annular cavity 38 as gauge portion 12 is pivoted relative to attachment portion 14. This arrangement allows gauge portion 12 to be pivoted relative to attachment portion 14, without interfering with the function of device 10, so that the device 10 may be folded when attached to the existing tire valve stem to thereby prevent the gauge portion 12 from projecting excessively from the rim of the vehicle wheel.

Air passage 30 openly communicates with annular cavity 36 while air passage 40 openly communicates with annular cavity 38. Air passage 40 also is in open communication with the interior of the central tube 42. A bleeder valve 44, also known in the art as a needle valve, controls fluid communication between the interior of the central tube 42 and the atmosphere.

The bleeder valve 44 is identical to the bleeder valves used on conventional valve stems. Bleeder valve 44 is screwed into the top opening 48 of central tube 42. Bleeder valve 44 has a central passage that is normally sealed by stopper 45. A spring loaded needle 47, when pressed in, moves the stopper 45 away from the entrance to the central passage of the valve 44, thus allowing air flow into and out of the tire. The familiar service station air hoses used for inflating tires have nozzles that have a centrally located pin. With device 10 mounted to the valve stem of a vehicle wheel, the pin of the air hose nozzle engages the needle 47 to open the valve 44 when the nozzle is pressed onto the open top 48 of the central tube 42, thus allowing air to be pumped into the tire.

A conventional valve stem cap 46 is threadedly securable to the central tube 42 over the top inlet 48 of the central tube 42. The threaded portion 50 on the exterior of the central tube 42 is longer than is necessary to merely secure the cap 46. The additional length of the threaded portion 50 allows the transparent sleeve 52 to be threadedly secured to the exterior of central tube 42.

The sleeve 52 encloses a substantially cylindrical, annular space around the exterior of central tube 42. A ring-shaped piston 56 is slidably disposed within the annular space enclosed by central tube 42 and sleeve 52. The piston 56 sealingly abuts the exterior of central tube 42 and the interior of sleeve 52, thus isolating the space 54 ahead of the piston 56 from the space 58 behind the piston 56. A passage 60 allows fluid communication between the interior of central tube 42 and space 54. An O-ring 62 near the base of central tube 42 also helps seal space 54 from the atmosphere.

The space 58 communicates with the atmosphere. This communication can be accomplished in many ways. For example a pin hole may be provided in sleeve 52 near top inlet 48, or threads 64 may be slightly oversize relative to threads 50. This feature allows the gauge pressure to be accurately reflected by the position of the piston 56.

Behind piston 56 the following items are disposed in the given order: a first flat washer 66, a first wavy washer 68, a second flat washer 70, a coil spring 72, a third flat washer 74, a second wavy washer 76, and a fourth flat washer 78. From fluid static principles it should readily be apparent that when valve 44 is closed the air pressure in the tire, in the interior of central tube 42, and in the space 54 will all be equal, since these spaces form parts of a single contiguous, enclosed air space. Spring 72 provides resistance to the force exerted on the piston 56 due to the air pressure in the tire.

Because the space 58 is open to the atmosphere, the piston 56 will come to rest in a position at which the force exerted on the piston by spring 72 approximately equals the force exerted on the piston due to the air pressure in the tire, the weight of the piston being negligibly small. The position of piston 56 within sleeve 52 will vary as a function of the pressure in the tire.

Transparent sleeve 52 allows the position of the piston 56, within sleeve 52, to be visualized by a user. The gauge portion 12 can be calibrated to determine the numerical value of tire pressure corresponding to various positions of piston 56. If desired indicia (not shown) can be provided on sleeve 52 in order to allow the approximate numerical value of the tire pressure to be determined by inspection. If the spring 72 becomes fully compressed at high pressure wavy washers 68 and 76 act as springs extending the pressure range over which gauge portion 12 can be used.

O-rings 80 and 82 seal annular cavities 36 and 38 from the atmosphere. Protective caps 84 protect the heads of the rivet 34 from foreign objects and the elements.

Referring to FIGS. 4–8 and 11, a second embodiment of the present invention is seen. This embodiment is also designed to attach to the valve stem of a vehicle's wheel in the manner of a standard valve stem cap (identical to cap 46 in FIGS. 1 and 2). The pressure monitoring device 86 has a filling portion 88 and an attachment portion 90. The attachment portion 90 has a threaded end 92 which screws on to the existing tire valve stem in the manner of the conventional valve stem cap. Set screw 94 engages a threaded hole 96 in the threaded end 92 and is used to frictionally lock the pressure monitoring device 86 to the tire valve stem after the device 86 is screwed on to the valve stem. This feature helps reduce the possibility of loosening or theft of the device 86.

The threaded end 92 has a threaded cavity 98 which is identical in construction to the cavity 22 of the first embodiment discussed above. In other words, the cavity 98 has the same raised platform 24 at the bottom thereof, and the same twin openings 32 as the cavity 22 shown in FIG. 3. The two openings at the bottom of cavity 98 (identical to openings 32 in FIG. 3) communicate with an air passage 100.

Figure 6:
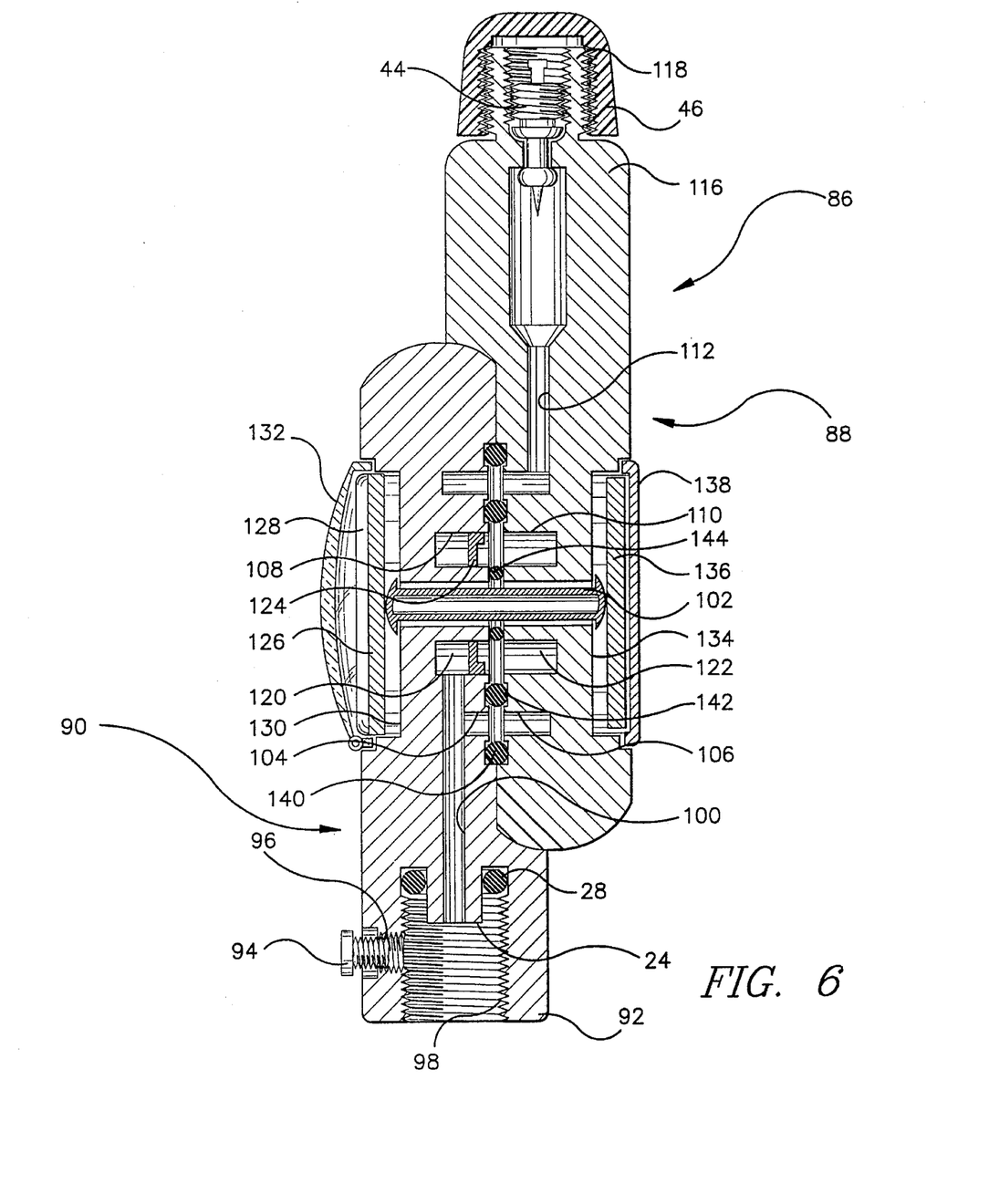
FIG. 6 is a cross sectional view of the pressure monitoring device with a digital display.
Figure 7:
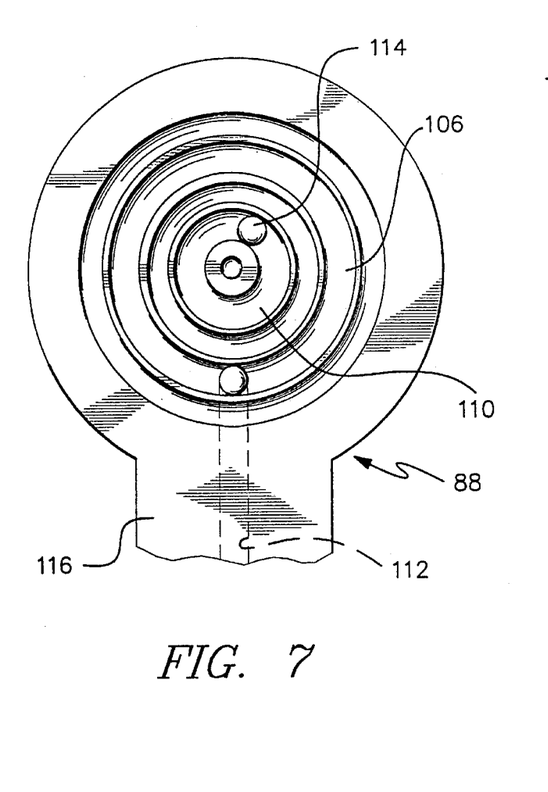
FIG. 7 is a fragmentary detail view of the arrangement of the annular cavities in the filling portion of the pressure monitoring device with the digital display.
Figure 8:
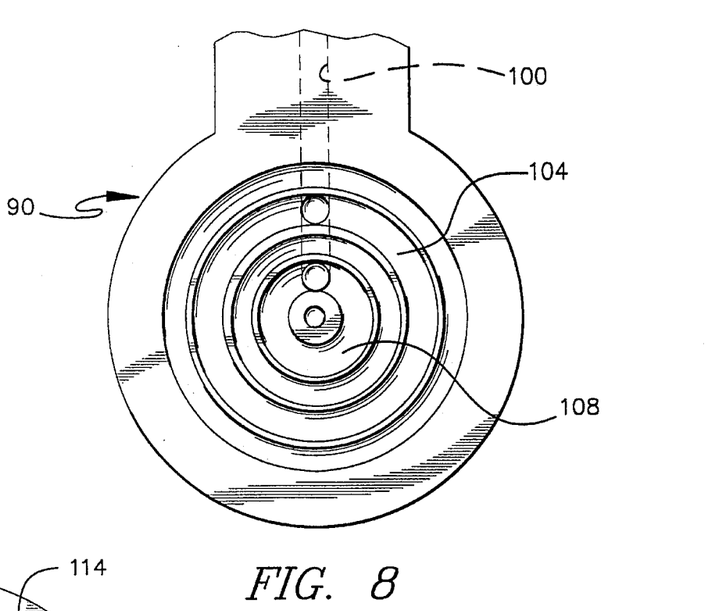
FIG. 8 is a fragmentary detail view of the arrangement of the annular cavities in the attachment portion of the pressure monitoring device with the digital display.

Attachment portion 90 is pivotably attached to filling portion 88 by rivet 102. Rivet 102 allows filling portion 88 to pivot relative to the attachment portion 90 about the longitudinal axis of the rivet 102. A first annular cavity 104 is formed in attachment portion 90, and a second annular cavity 106 is formed in filling portion 88. The air passage 100 communicates with first annular cavity 104 which remains in continuous registry, and thus fluid communication, with the second annular cavity 106 as filling portion 88 is pivoted relative to attachment portion 90. A third annular cavity 108 is formed in attachment portion 90, and a fourth annular cavity 110 is formed in filling portion 88. The air passage 100 also communicates with the third annular cavity 108 which remains in continuous registry, and thus fluid communication, with the fourth annular cavity 110 as filling portion 88 is pivoted relative to attachment portion 90. An air passage 112 communicates with annular cavity 106. Also, an air passage 114 allows fluid communication between annular cavity 110 and the atmosphere. This arrangement allows filling portion 88 to be pivoted relative to attachment portion 90, without interfering with the function of device 86, so that the device 86 may be folded when attached to the existing tire valve stem to thereby prevent the filling portion 88 from projecting excessively from the rim of the vehicle wheel.

Because air passage 100 openly communicates with annular cavity 104 and air passage 112 openly communicates with annular cavity 106, there is constant open fluid communication between air passage 100 and the interior of the filling tube 116. This arrangement allows the filling of the tire through the filling portion 88. The top inlet 118 is identical to the inlet of a conventional tire valve stem, and is threaded both internally and externally. The external threads allow the securing of a cap 46 to the inlet 118, while the internal threads allow a bleeder valve 44 to be installed in the inlet 118. The cap 46 and the bleeder valve 44 are identical to those used with the first embodiment.

The annular air space formed by annular cavities 108 and 110 is divided into a first space 120 and a second space 122 by a thin film or solid state pressure sensor 124. Such sensors are well known and will not be described in detail here. Because space 120 communicates with the interior of the tire via passage 100 and the space 122 communicates with the atmosphere via passage 114, the sensor 124 will measure the gauge pressure of the tire. The sensor 124 communicates electrically with the circuit board 126 which in turn communicates with a digital display 128, of for example the liquid crystal type. The circuit board 126 and the display 128 are housed in a cavity 130, formed in the attachment portion 90, which also houses one head of the rivet 102. A hinged, protective cover 132 may be provided for the display 128. The protective cover 132 may optionally be transparent. Also the protective cover 132 may actuate an on/off switch for the display 128 in order to conserve battery power, the display being turned off when the cover is closed.

The other head of the rivet 102 is housed in a cavity 134 formed in the filling portion 88. The cavity 134 also houses a rechargeable battery 136 and a solar cell 138, the solar cell being exposed to the environment. The solar cell 138 recharges the battery 136 by known means. Power from the battery and/or the solar cell can be supplied by conductors (not shown) passing through the hollow rivet 102. Optionally the rivet 102 may also house a microtransmitter which transmits tire pressure data to a display mounted on the vehicle's dash board. As before O-rings 140, 142, and 144 seal the annular cavities from the atmosphere at the junction between the attachment portion 90 and the filling portion 88.

Figure 11:
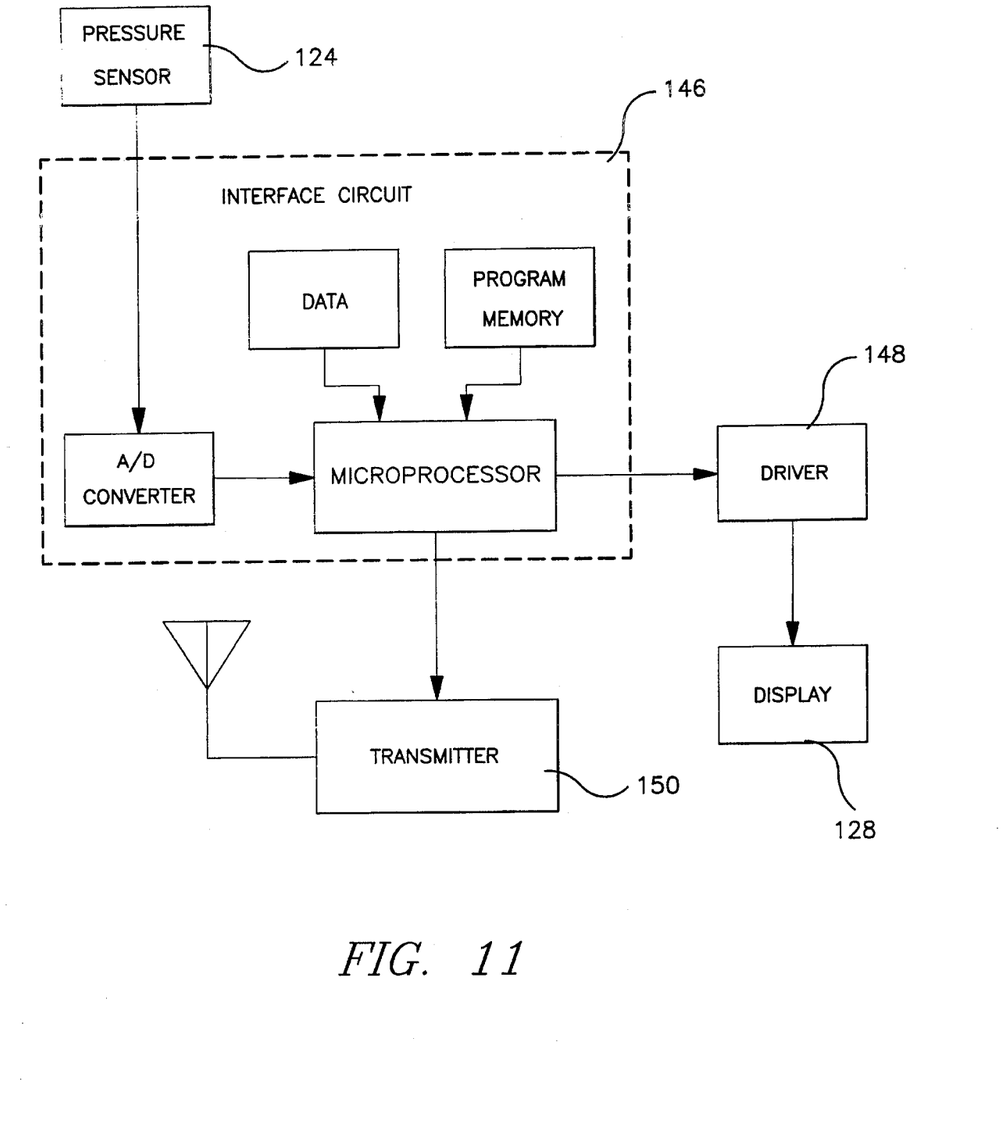
FIG. 11 is a schematic diagram of the electronic circuit usable with the present invention.

Referring to FIG. 11 an example of the circuit components useable with the second embodiment 86 can be seen. In such a circuit, the pressure sensor 124 communicates with a microprocessor based interface circuit 146 which in turn supplies pressure data to a driver 148 for the display 128 and to the optional transmitter 150. All the electronic components usable with the present invention are well known and are therefore not described in detail herein.

Figure 12:
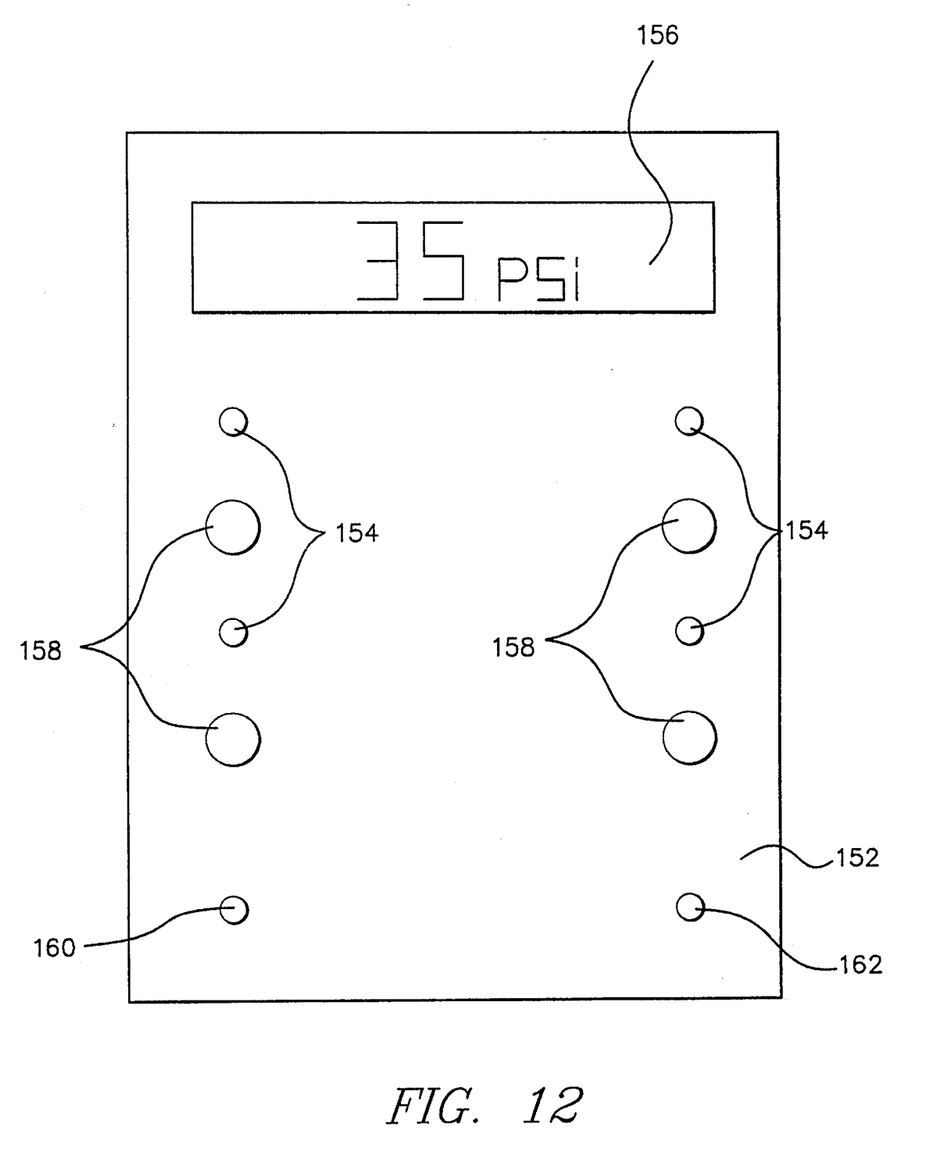
FIG. 12 is a front view of the display for the interior of the vehicle.

Referring to FIG. 12, a display mountable on the vehicle's dash can be seen. The display 152 receives data from transmitter 150. Buttons 154 corresponding in number to the tires are provided so that the driver can select the tire whose pressure is to be displayed. Digital display 156, of any suitable type, shows the numerical value of the pressure of the selected tire. Lights 158 indicate the tire whose pressure is currently being displayed. The preset button 160 is used to set a minimum pressure value so that an alarm (not shown) will sound if the pressure of any tire falls bellow the minimum pressure. Reset button 162 turns off the alarm. Circuits and devices needed to implement all the functions of the display 152 are well known and available off-the-shelf.

Figure 9:
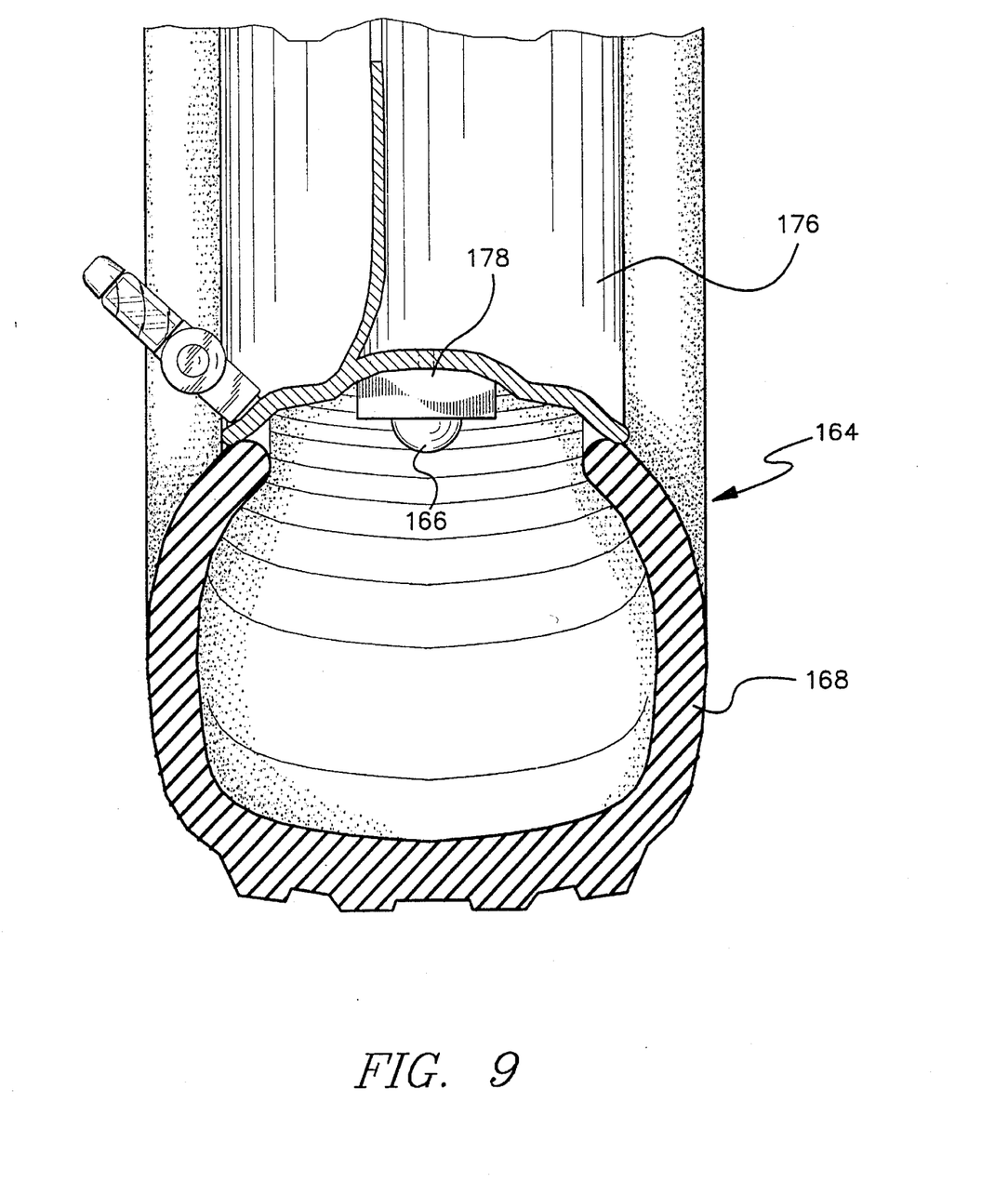
FIG. 9 is an environmental view of the pressure monitoring device design for placement inside the tire.
Figure 10:
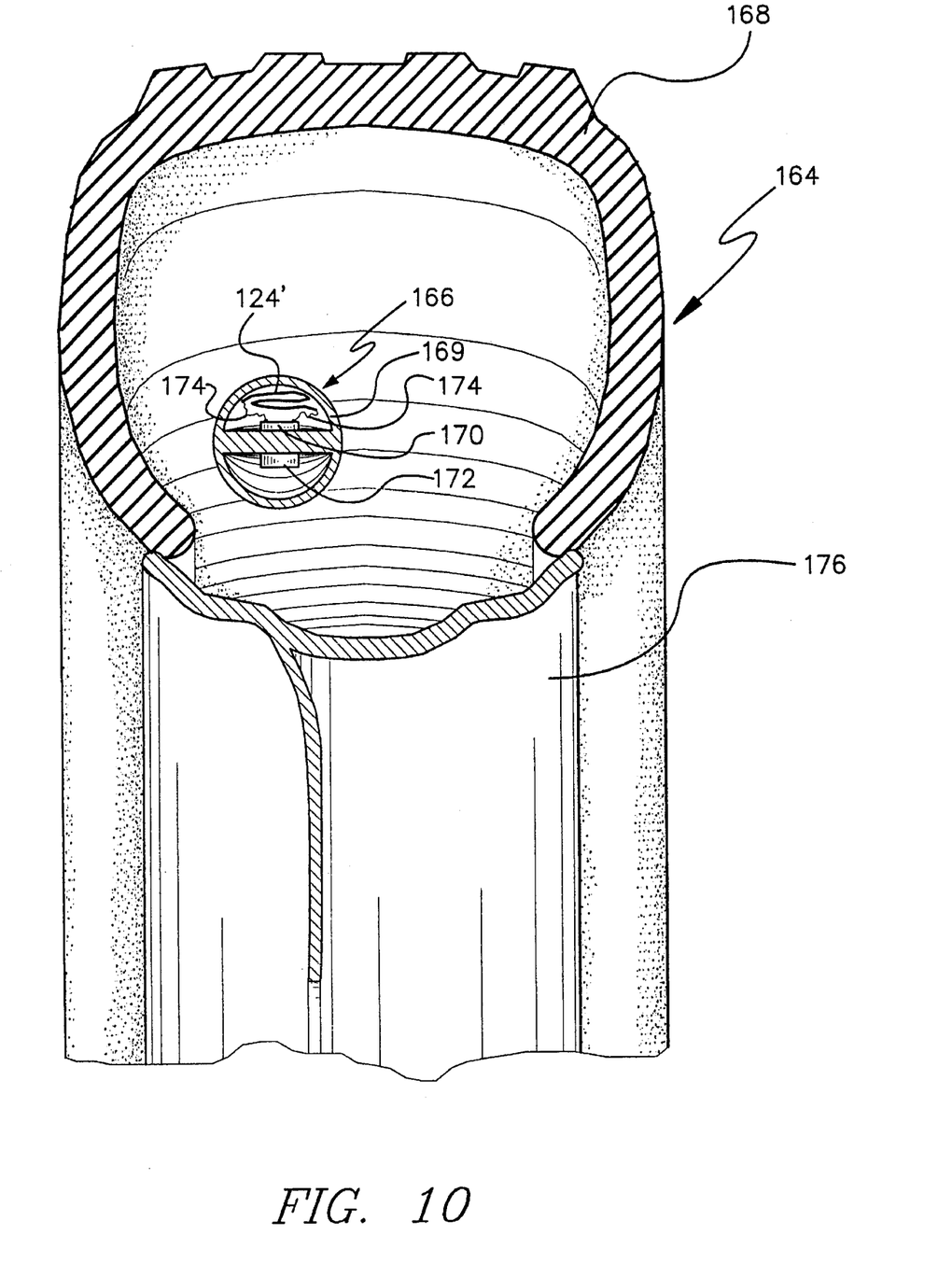
FIG. 10 is an environmental view of the pressure monitoring device design for placement inside the tire, shown fixed to the rim.

Referring to FIGS. 9 and 10 a vehicle wheel 164 is shown in partial cross section. In this embodiment the pressure sensing unit 166 is placed in the interior of the tire 168. Sensing unit 166 includes a hollow evacuated housing 169 containing circuitry 170 which includes the components shown in FIG. 11. Circuitry 170 is powered by power supply 172 which is of the piezoelectric or inertial type which generates power from the movement of the tire during normal driving. Such power supplies are used in cigarette lighters and self-winding watches, and are well known. A thin film pressure sensor 124' can be formed directly on the interior of the wall of the housing 169. Sensor 124' electrically communicates with circuitry 170 by wires 174. Circuitry 170 must include the transmitter 150 to allow the tire pressure to be displayed using display 152.

Referring to FIG. 10, sensing unit 166 is shown fixed to the wheel rim 176 instead of being free to roll inside the tire 168. Sensing unit 166 is fixed to rim 176 by a mounting block 178 in the illustrated example. In such an arrangement, a pin hole can be provided between the interior of the housing 169 and the atmosphere thereby allowing the sensing unit 166 to measure gauge pressure directly, instead of absolute pressure. In the embodiment of FIG. 9, an external atmospheric pressure sensor would be needed to allow automatic calculation of the gauge pressure by the display 152 using the absolute pressure value supplied by the sensing unit 166.

It is to be understood that the present invention is not limited to the embodiments described above, but encompasses any and all embodiments within the scope of the following claims.

I claim:

1. A tire pressure monitoring device for use with a pneumatic wheel assembly mounted to a vehicle, the wheel assembly including a wheel supporting a tire, the tire having an interior filled with air and the air having a pressure, said tire pressure monitoring device comprising:

an attachment portion having a hollow passage therein, said attachment portion being securable to an existing valve stem such that said hollow passage communicates with the interior of the tire; and a gauge portion having a central tube with a hollow interior, said gauge portion having a first and a second end, said first end being hingedly attached to said attachment portion such that said hollow interior communicates with said hollow passage, said central tube having a bleeder valve at said second end and said central tube supporting a pressure gauge, whereby said tire pressure monitoring device can be folded so as to reduce a distance to which said tire pressure monitoring device projects from the wheel.

2. The tire pressure monitoring device according to claim 1, wherein said pressure gauge includes:

a sleeve supported by said central tube, said sleeve defining an annular space in cooperation with said central tube; and a piston and spring disposed within said annular space, said piston dividing said annular space into a first side and a second side, said spring being positioned in said first side, said central tube having a passage allowing communication between said hollow interior and said second side, whereby said piston is positioned within said annular space responsive to air pressure in the tire.

3. The tire pressure monitoring device according to claim 1, wherein said first end of said central tube is pivotally attached to said attachment portion by a rivet, said first end of said central tube having a first annular cavity communicating with said hollow interior, said first annular cavity being concentric with said rivet, said first annular cavity being in registry with a second annular cavity formed in said attachment portion, said second annular cavity being in communication with said hollow passage, whereby uninterrupted communication can be maintained between said hollow interior and said hollow passage as said gauge portion is pivoted relative to said attachment portion.

4. A tire pressure monitoring device for use with a pneumatic wheel assembly mounted to a vehicle, the wheel assembly including a wheel supporting a tire, the tire having an interior filled with air and the air having a pressure, said tire pressure monitoring device comprising:

an attachment portion having a hollow passage therein, said attachment portion being securable to an existing valve stem such that said hollow passage communicates with the interior of the tire;

a filling portion having a hollow interior, said filling portion having a first and a second end, said first end being hingedly attached to said attachment portion such that said hollow interior communicates with said hollow passage, said filling portion having a bleeder valve at said second end, whereby said tire pressure monitoring device can be folded so as to reduce a distance to which said tire pressure monitoring device projects from the wheel; and electronic pressure sensing means mounted to said tire pressure monitoring device, said electronic pressure sensing means including a digital display for displaying sensed pressure.

5. The tire pressure monitoring device according to claim 4, wherein said first end of said filling portion is pivotably attached to said attachment portion by a rivet, said first end of said filling portion having a first annular cavity communicating with said hollow interior, said first annular cavity being concentric with said rivet, said first annular cavity being in registry with a second annular cavity formed in said attachment portion, said second annular cavity being in communication with said hollow passage, whereby uninterrupted communication can be maintained between said hollow interior and said hollow passage as said filling portion is pivoted relative to said attachment portion.

6. The tire pressure monitoring device according to claim 5, wherein said electronic pressure sensing means includes a transmitter for communicating pressure data to a display unit mounted in the vehicle's interior.

7. A tire pressure monitoring device for use with a pneumatic wheel assembly mounted to a vehicle, the wheel assembly including a wheel supporting a tire, the wheel assembly having an interior filled with air and the air having a pressure, said tire pressure monitoring device comprising:

a hollow housing having a wall with an exterior and an interior;

a pressure sensor formed on said interior of said wall;

circuit means for converting output from said pressure sensor to electronic pressure data, said circuit means housed within said housing; and power supply means for converting motion of the wheel assembly to electrical energy, said power supply means being housed in said housing and communicating with said circuit means.

8. The tire pressure monitoring device according to claim 7, wherein said circuit means includes a transmitter for communicating said electronic pressure data to a display unit mounted in the vehicle's interior.

* * * * *